United States Patent
Bhakta et al.

(10) Patent No.: US 12,429,694 B2
(45) Date of Patent: Sep. 30, 2025

(54) OPTICAL SYSTEMS HAVING LIGHT SOURCES WITH POWER SAVING MODES

(71) Applicant: Apple Inc., Cupertino, CA (US)

(72) Inventors: Vikrant Bhakta, Santa Clara, CA (US); Guolin Peng, Sunnyvale, CA (US); Hyungryul Choi, San Jose, CA (US); Jose A. Dominguez-Caballero, San Jose, CA (US)

( * ) Notice: Subject to any disclaimer, the term of this patent is extended or adjusted under 35 U.S.C. 154(b) by 421 days.

(21) Appl. No.: 18/156,309

(22) Filed: Jan. 18, 2023

(65) Prior Publication Data

US 2023/0341690 A1 Oct. 26, 2023

Related U.S. Application Data

(63) Continuation of application No. PCT/US2021/042237, filed on Jul. 19, 2021.

(60) Provisional application No. 63/056,496, filed on Jul. 24, 2020.

(51) Int. Cl.
*G02B 27/01* (2006.01)

(52) U.S. Cl.
CPC .. *G02B 27/0172* (2013.01); *G02B 2027/0114* (2013.01); *G02B 2027/0118* (2013.01); *G02B 2027/0174* (2013.01)

(58) Field of Classification Search
CPC ............ G02B 27/0172; G02B 2027/0114
USPC ........................................................ 359/630
See application file for complete search history.

(56) References Cited

U.S. PATENT DOCUMENTS

| | | | |
|---|---|---|---|
| 3,942,185 A | 3/1976 | Lebailly | |
| 10,838,132 B1 * | 11/2020 | Calafiore | G02B 6/0015 |
| 11,054,654 B1 * | 7/2021 | Shih | G02B 27/145 |
| 12,292,571 B2 * | 5/2025 | Sissom | G02B 27/0149 |
| 2013/0051730 A1 * | 2/2013 | Travers | G02B 27/4272 385/37 |
| 2014/0036361 A1 * | 2/2014 | Woodgate | G02B 6/0061 385/9 |
| 2018/0120559 A1 * | 5/2018 | Yeoh | G02B 26/0833 |
| 2018/0120563 A1 * | 5/2018 | Kollin | G03B 21/005 |
| 2018/0275410 A1 | 9/2018 | Yeoh et al. | |
| 2020/0081176 A1 * | 3/2020 | Bartlett | G02B 6/0016 |
| 2020/0409156 A1 * | 12/2020 | Sissom | G02B 27/0172 |
| 2021/0018752 A1 * | 1/2021 | Sheng | G02B 6/0018 |
| 2022/0269077 A1 * | 8/2022 | Adema | G02B 27/0081 |
| 2023/0027493 A1 * | 1/2023 | Shams | G02B 6/0088 |

(Continued)

FOREIGN PATENT DOCUMENTS

WO 2021055230 A1 3/2021

*Primary Examiner* — Allyson N Trail
(74) *Attorney, Agent, or Firm* — Treyz Law Group, P.C.; Michael H. Lyons; Jinie M. Guihan

(57) ABSTRACT

A display may include illumination optics, a spatial modulator, and a waveguide. The illumination optics may produce illumination that is modulated by the spatial modulator to produce image light. The waveguide may direct the image light towards an eye box. The illumination optics may include light source sets that produce the illumination. Each set may include a low power light source and a high power light source. In a first state, the high and low power light sources may be active. In a second state, the low power light sources may be active. Control circuitry may adjust between the first and second states based on image data. The second state may be used when virtual objects in the image data are confined to a peripheral region of the field of view of the eye box.

17 Claims, 7 Drawing Sheets

(56) References Cited

U.S. PATENT DOCUMENTS

| | | | |
|---|---|---|---|
| 2023/0341690 A1* | 10/2023 | Bhakta | G02B 27/0172 |
| 2024/0319508 A1* | 9/2024 | Sinay | G02B 27/017 |
| 2024/0427157 A1* | 12/2024 | Connor | G02B 26/0816 |
| 2025/0147329 A1* | 5/2025 | Cheng | G02B 27/1026 |

* cited by examiner

OPTICAL SYSTEMS HAVING LIGHT SOURCES WITH POWER SAVING MODES

This application is a continuation of international patent application No. PCT/US2021/042237, filed Jul. 19, 2021, which claims priority to U.S. provisional patent application No. 63/056,496, filed Jul. 24, 2020, which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module and a waveguide. The display module may include a spatial light modulator and illumination optics. The illumination optics may produce illumination light. The spatial light modulator may modulate the illumination light using image data to produce image light. The waveguide may direct the image light towards an eye box. The illumination optics may include one or more light source sets that produce the illumination light. Each light source set may include a low power light source that emits a first portion of the illumination light and a high power light source that emits a second portion of the illumination light. The second portion may have greater intensity than the first portion. Each light source set may emit light within the same respective color band. Each light source set may be formed from emissive surfaces of respective light-emitting diode (LED) packages. If desired, two or more light source sets may be formed from emissive surfaces of the same LED package.

The control circuitry may adjust the illumination optics between at least first and second operating states based on the image data. In the first operating state, the high and low power light sources may be active. In the second operating state, the low power light sources may be active while the high power light sources are inactive. The control circuitry may, for example, place the illumination optics in the second operating state when virtual objects in the image data are confined to a peripheral region of the field of view of the eye box. The illumination light produced by the low power light sources may be sufficient for these virtual objects to be clearly viewed at the eye box. The control circuitry may place the illumination optics in the first operating state when the image data includes other virtual objects requiring more power to be clearly viewed at the eye box. This may serve to minimize power consumption within the display system without sacrificing image quality.

DETAILED DESCRIPTION

Figure 1:
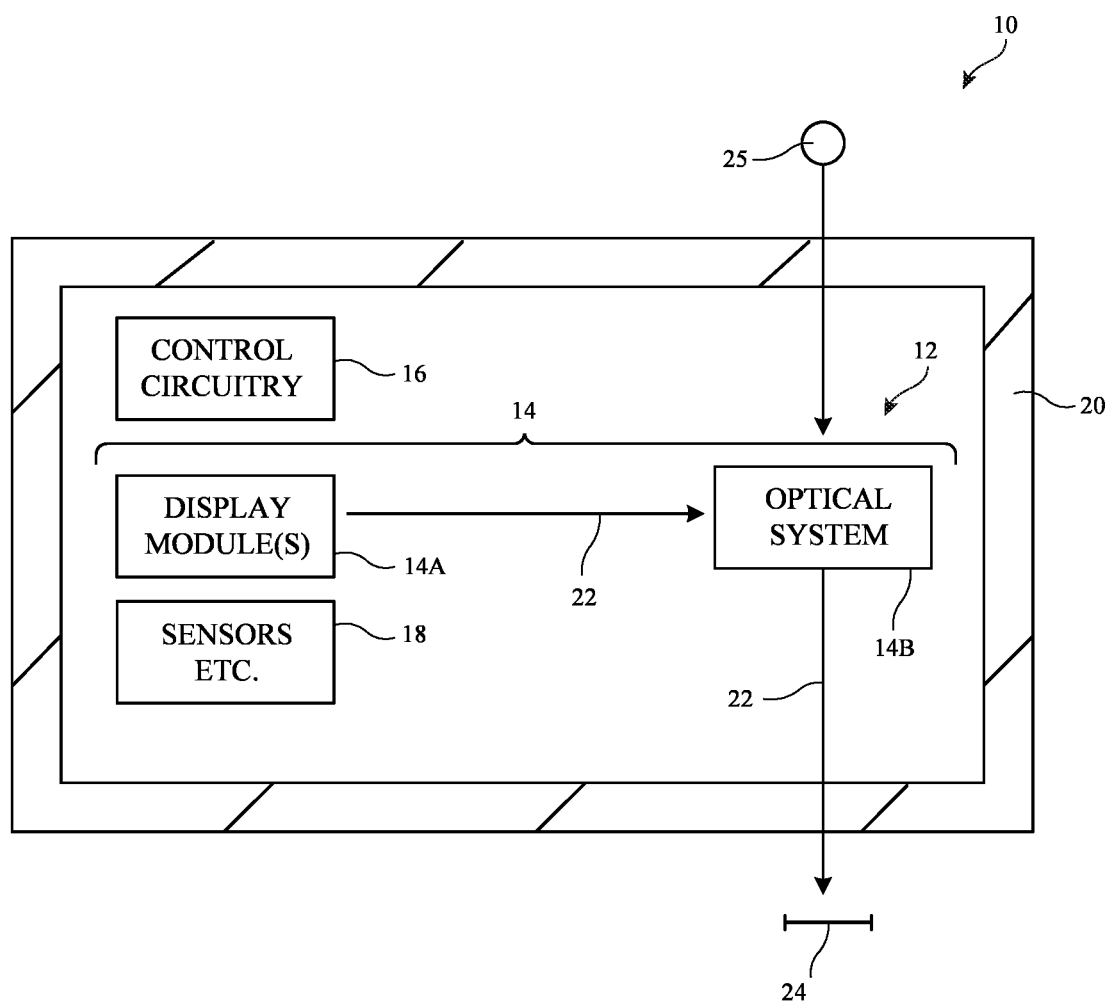
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). If desired, components 18 may include gaze tracking sensors that gather gaze image data from a user's eye at eye box 24 to track the direction of the user's gaze in real time.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
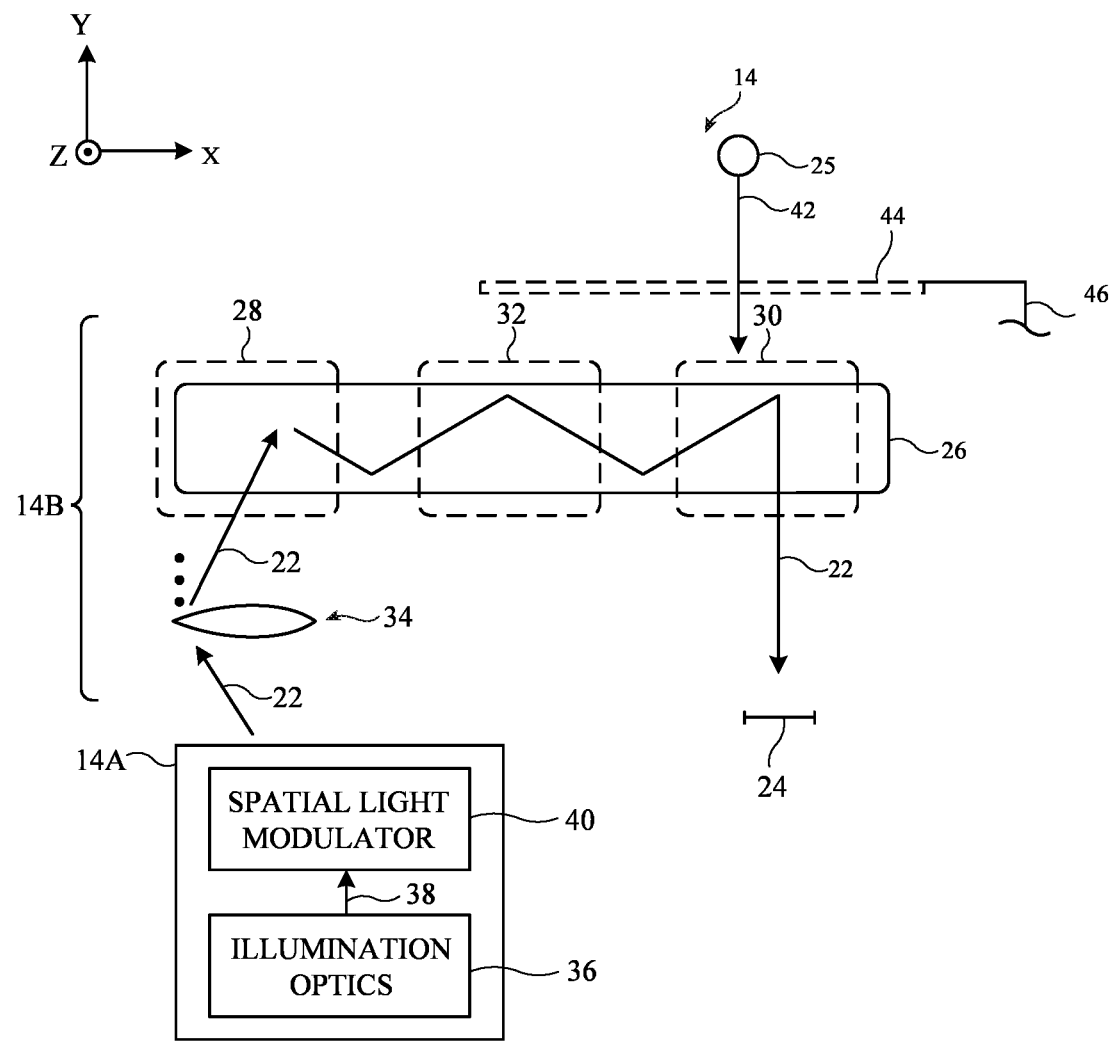
FIG. 2 is a top view of an illustrative optical system for a display having a display module that provides image light to a waveguide in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate image light 22 associated with image content to be displayed to (at) eye box 24. In the example of FIG. 2, display module 14A includes illumination optics 36 and spatial light modulator 40. Illumination optics 36 may produce illumination light 38 (sometimes referred to herein as illumination 38)

and may illuminate spatial light modulator 40 using illumination light 38. Spatial light modulator 40 may modulate illumination light 38 (e.g., using image data) to produce image light 22 (e.g., image light that includes an image as identified by the image data). Spatial light modulator 40 may be a reflective spatial light modulator (e.g., a DMD modulator, an LCOS modulator, etc.) or a transmissive spatial light modulator (e.g., an LCD modulator). These examples are merely illustrative and, if desired, display module 14A may include an emissive display panel instead of a spatial light modulator. Examples in which spatial light modulator 40 is a reflective spatial light modulator are described herein as an example.

Image Light 22 may be collimated using collimating optics 34. Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26, whereas output coupler 30 may be configured to couple image light 22 from within waveguide 26 to the exterior of waveguide 26 and towards eye box 24. Input coupler 28 may include an input coupling prism if desired. As an example, display module(s) 14A may emit image light 22 in the +Y direction towards optical system 14B. When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30) or one or more layers of diffractive grating structures.

If desired, an optional tint layer 44 may be layered over waveguide 26. Tint layer 44 may help to reduce the brightness of world light 42 from real-world objects 25 prior to the world light being transmitted through waveguide 26. If desired, tint layer 44 may exhibit a transmission profile that varies as a function of wavelength so that world light 42 is tinted with a desired color before passing to eye box 24.

Tint layer 44 may be adjustable. For example, tint layer 44 may receive control signals over control path 46 that adjust the amount of world light 42 that tint layer 44 passes to waveguide 26. Tint layer 44 may, if desired, be adjusted to tune the color of the tint applied to world light 42 before world light 42 is passed to waveguide 26. Tint layer 44 may, for example, include an electrochromic layer, a photochromic layer, a guest host liquid crystal layer, etc. Tint layer 44 may be omitted if desired.

Figure 3:
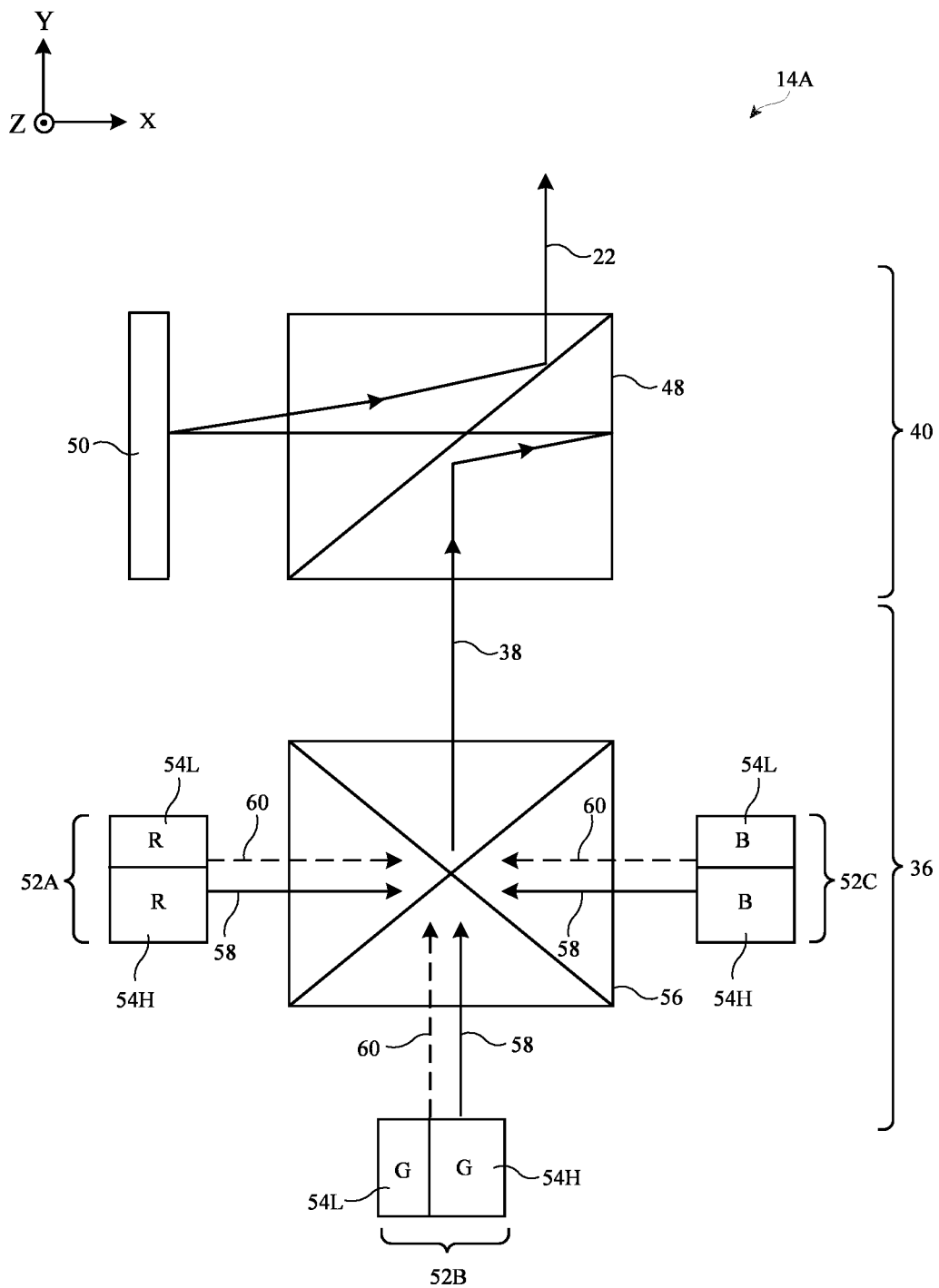
FIG. 3 is a top view of an illustrative display module having illumination optics with sets of light sources that are operable in a power saving mode in accordance with some embodiments.

FIG. 3 is a top view of display module 14A in an example where spatial light modulator 40 is a reflective spatial light modulator. As shown in FIG. 3, display module 14A may include illumination optics 36 that provide illumination light 38 to spatial light modulator 40. Spatial light modulator 40 may modulate images onto illumination light 38 to produce image light 22.

Illumination optics 36 may include one or more sets 52 of light sources 54. Each set 52 (sometimes referred to herein as light source sets 52) may emit illumination light of the same wavelength band (color) (e.g., all of the light sources 54 in each light source set 52 may emit illumination light of the same color). For example, as shown in FIG. 3, illumination optics 36 may include a first light source set 52A that emits illumination light of a first color (e.g., red (R) illumination light), a second light source set 52B that emits illumination light of a second color (e.g., green (G) illumination light), and a third light source set 52C that emits illumination light of a third color (e.g., blue (B) illumination light). This example is merely illustrative. In general, each light source set 52 may emit light of any desired color. Illumination optics 36 may include one light source set 52, two light source sets 52, or more than three light source sets 52 if desired.

Each light source set 52 may include at least a first light source 54H and a second light source 54L. Light sources 54H may emit a first portion of the illumination light, as shown by arrows 58. Light sources 54L may emit a second portion of the illumination light, as shown by dashed arrows 60. Prism 56 (e.g., an X-plate) may combine the light emitted by each of the light sources 54L and 54H in illumination optics 36 into illumination light 38 (e.g., illumination light 38 may include red, green, and blue light emitted by the light sources 54L and/or 54H in light source sets 52A, 52B, and 52C).

In one suitable arrangement that is described herein as an example, light sources 54H may emit brighter and more intense illumination light (e.g., may consume more power) than light sources 54L (e.g., the portion of the illumination light associated with arrows 58 may be brighter or more intense than the portion of the illumination light associated with arrows 60). Light sources 54L may therefore sometimes be referred to herein as low power light sources 54L whereas light sources 54H are sometimes referred to herein as high power light sources 54H. This is merely illustrative and, in another suitable arrangement, light sources 54H and light sources 54L may emit illumination light of the same brightness/intensity.

Light sources 54H and 54L may include LEDs, OLEDs, uLEDs, lasers, etc. An example in which light sources 54H and 54L are LED light sources is described herein as an example. In the example of FIG. 3, each light source set 52 includes two light sources 54 (e.g., a respective high power light source 54H and a respective low power light source 54L). This is merely illustrative. If desired, each light source set 52 may include more than one high power light source 54H and/or more than one low power light source 54L.

If desired, each light source 54 may be formed from a separately (independently) controlled emissive surface of the LED package used to form the corresponding light source set 52. For example, the high power light source 54H in light source set 52A may be formed from a first emissive surface (e.g., an emissive surface that emits red illumination light, as shown by arrow 58) of a first LED package that is used to form light source set 52A. The low power light source 54L in light source set 52A may be formed from a second emissive surface of the first LED package. The second emissive surface may emit red illumination light, as shown by arrow 60, and may, if desired, occupy less lateral area on the first LED package than the first emissive surface that forms the high power light source 54H in light source set 52A. The high power light source 54H in light source set 52A may be separately addressable from the low power light source 54L in light source set 52A for control circuitry 16 (FIG. 1). For example, control circuitry 16 may separately and independently control the operation of the light sources 54H and 54L in light source set 52A.

Similarly, the high power light source 54H in light source set 52B may be formed from a first emissive surface (e.g., an emissive surface that emits green illumination light, as shown by arrow 58) of a second LED package that is used to form light source set 52B. The low power light source 54L in light source set 52B may be formed from a second emissive surface of the second LED package. The second emissive surface may emit green illumination light, as shown by arrow 60, and may, if desired, occupy less lateral area on the second LED package than the emissive surface that forms the high power light source 54H in light source set 52B. The high power light source 54H in light source set 52B may be separately addressable from the low power light source 54L in light source set 52B for control circuitry 16 (FIG. 1). For example, control circuitry 16 may separately and independently control the operation of the light sources 54H and 54L in light source set 52B.

Similarly, the high power light source 54H in light source set 52C may be formed from a first emissive surface (e.g., an emissive surface that emits blue illumination light, as shown by arrow 58) of a third LED package that is used to form light source set 52C. The low power light source 54L in light source set 52C may be formed from a second emissive surface of the third LED package. The second emissive surface may emit blue illumination light, as shown by arrow 60, and may, if desired, occupy less lateral area on the third LED package than the emissive surface that forms the high power light source 54H in light source set 52C. The high power light source 54H in light source set 52C may be separately addressable from the low power light source 54L in light source set 52C for control circuitry 16 (FIG. 1). For example, control circuitry 16 may separately and independently control the operation of the light sources 54H and 54L in light source set 52C.

Illumination light 38 may include the illumination light generated by light source set 52A (e.g., red light), the illumination light generated by light source set 52B (e.g., green light), and/or the illumination light generated by light source set 52C (e.g., blue light). Prism 56 may provide illumination light 38 to spatial light modulator 40. Lens elements (not shown in FIG. 3 for the sake of clarity) may be used to help direct illumination light 38 from illumination optics 36 to spatial light modulator 40 if desired. Additional optical components (not shown in FIG. 3 for the sake of clarity) such as lenses, microlenses, polarizers, or other optical components may be interposed between light source sets 52A-52C and prism 56 if desired.

Spatial light modulator 40 may include prism 48 and a reflective display panel such as display panel 50. Display panel 50 may be a DMD panel, an LCOS panel, or other reflective display panel. Prism 48 may direct illumination light 38 onto display panel 50 (e.g., different pixels on display panel 50). Control circuitry 16 may control display panel 50 to selectively reflect illumination light 38 at each pixel location to produce image light 22 (e.g., image light having an image as modulated onto the illumination light by display panel 50). Prism 48 may direct image light 22 to collimating optics 34 of FIG. 2.

In general, it may be desirable to provide eye box 24 (FIG. 2) with images (e.g., images of virtual objects) in image light 22 that are as bright as possible. This is particularly important in scenarios where world light 42 of FIG. 2 is also provided to the eye box, because world light 42 tends to be very bright and, if care is not taken, can undesirably wash out the virtual objects conveyed by image light 22. Increasing the brightness of illumination light 38 generally serves to increase the brightness of image light 22. In order to maximize the brightness of images in the image light 22 provided to eye box 24, control circuitry 16 may control light source sets 52A, 52B, and 52C to concurrently emit illumination light using both low power light sources 54L and high power light sources 54H (e.g., low power light sources 54L and high power light sources 54H may both be concurrently active so illumination light 38 is produced from a combination of the illumination light associated with arrows 60 and 58 of FIG. 3).

However, there may be some scenarios where the combined power (brightness) of high power light sources 54H and low power light sources 54L is not needed to produce image light 22. For example, less total brightness may be needed for virtual objects in image light 22 to be clearly perceived at eye box 24 when the virtual objects are relatively small or confined within a relatively small subset or portion of the total field of view of eye box 24. Such relatively small objects may include, for example, graphical elements provided within a peripheral portion of the field of view of eye box 24. In these scenarios, providing illumination light 38 with maximum brightness (e.g., by concurrently activating all of the high power light sources 54H and low power light sources 54L in illumination optics 36) may consume more power in display module 14A than necessary to produce clearly visible virtual objects at eye box 24. This excessive power consumption may undesirably limit the battery life of system 10, for example.

In order to conserve power in system 10, control circuitry 16 may independently control the high power light sources 54H and the low power light sources 54L in illumination optics 36 so that only low power light sources 54L are active at certain times. For example, control circuitry 16 may control illumination optics 36 to produce illumination light 38 using only low power light sources 54L when the image data to be conveyed by image light 22 only includes relatively small virtual objects or virtual objects that are limited to a subset of the field of view of eye box 24 (e.g., when image light 22 includes graphical elements for display within a peripheral portion of the field of view). When the image data to be conveyed by image light 22 includes larger virtual objects, virtual objects that extend beyond a peripheral portion of the field of view, virtual objects that require a brightness above a threshold brightness, and/or when ambient lighting conditions exceed a minimum threshold value, control circuitry 16 may control illumination optics 36 to produce illumination light 38 using both low power light sources 54L and high power light sources 54H. This may ensure that these virtual objects can still be clearly viewed at eye box 24 while also reducing the overall power consumed by display module 14A over time.

The example of FIG. 3 is merely illustrative. Each light source set 52 may include any desired number of high power light sources 54H and/or low power light sources 54L. Illumination optics 36 may include any desired number of light source sets 52. Each light source set 52 may emit illumination light in any desired wavelength band. If desired, spatial light modulator 40 may be a transmissive spatial light modulator (e.g., an LCD panel with pixels that transmit illumination light 38 and that modulate the transmitted illumination light with the image data to form image light 22). If desired, two or more of the light source sets 52 in illumination optics 36 may be formed from the same LED package.

Figure 4:
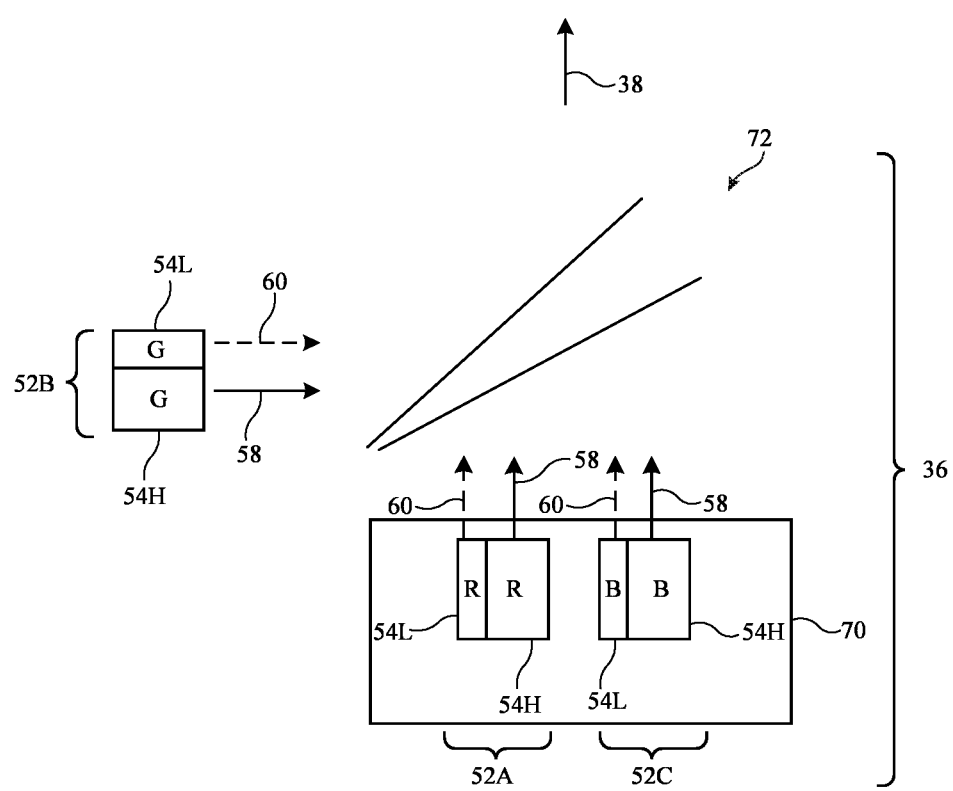
FIG. 4 is a diagram showing how different illustrative sets of light sources may be integrated into a common package in accordance with some embodiments.

FIG. 4 is a diagram showing how two or more of the light source sets 52 in illumination optics 36 may be formed from the same (shared) LED package. As shown in FIG. 4, light source set 52B may be formed from a first LED package (e.g., where the low power light source 54L and high power light source 54H in light source set 52B are formed from respective emissive regions of the first LED package). Light source sets 52A and 52C may be formed from a second LED package 70. For example, the high power light source 54H in light source set 52A may be formed from a first emissive region of second LED package 70, the low power light source 54L in light source set 52A may be formed from a second emissive region of second LED package 70, the high power light source 54H in light source set 52C may be formed from a third emissive region of second LED package 70, and the low power light source 54L in light source set 52C may be formed from a fourth emissive region of second LED package 70. The first emissive region may be larger than the second emissive region. The third emissive region may be larger than the fourth emissive region. The fourth emissive region may be the same size as the second emissive region or the fourth and second emissive regions may be different sizes. The first emissive region may be the same size as the third emissive region or the first and third emissive regions may be different sizes.

When arranged in this way, a dichroic element such as dichroic filter 72 may combine the illumination light emitted by the low power light sources 54L in the first and second LED packages (e.g., as shown by arrows 60) and the illumination light emitted by the high power light sources 54H in the first and second LED packages (e.g., as shown by arrows 58) to produce illumination light 38.

The example of FIG. 4 is merely illustrative. In another suitable arrangement, light source set 52B and light source set 52C may be formed from second LED package 70 whereas light source set 52A is formed from the first LED package. In yet another suitable arrangement, light source set 52A and light source set 52B may be formed from second LED package 70 whereas light source set 52C is formed from the first LED package. If desired, all three light source sets 52A, 52B, and 52C may be formed from different regions of the same LED package.

Figure 5:
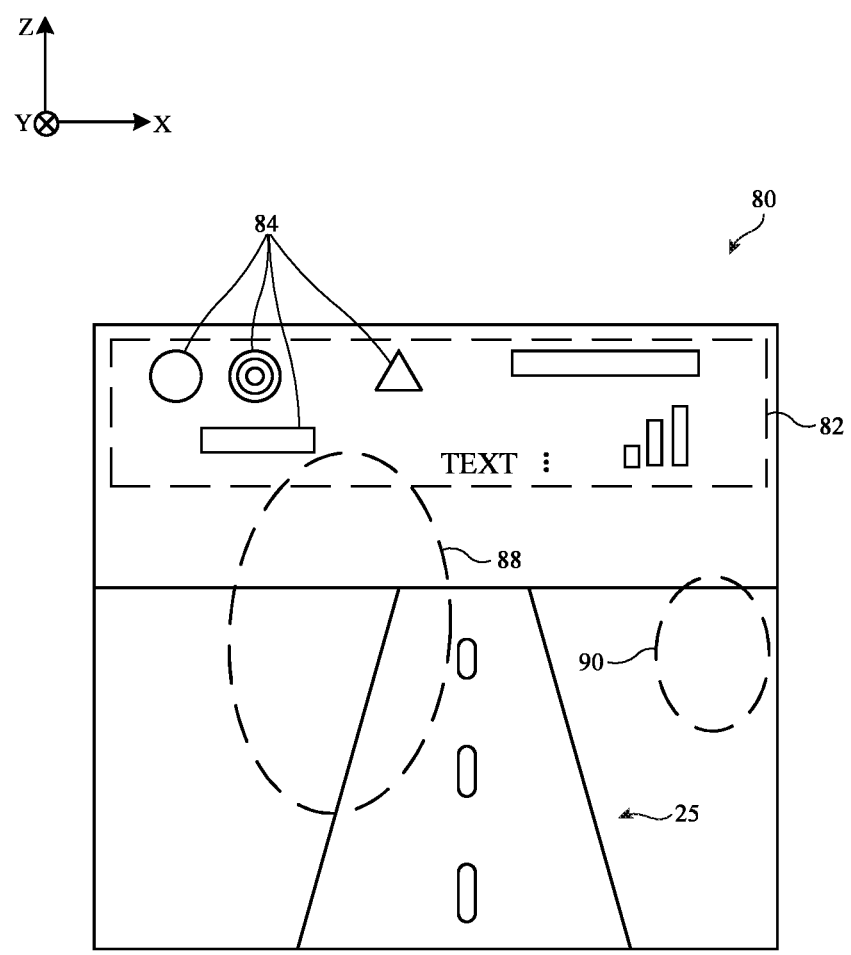
FIG. 5 is a diagram of an illustrative field of view of light provided to an eye box that includes image data within a peripheral region of the field of view in accordance with some embodiments.

FIG. 5 is a diagram of an exemplary field of view at eye box 24 when provided with both world light 42 and image light 22 (FIG. 2). As shown in FIG. 5, eye box 24 may have an associated field of view 80. Field of view 80 may include real-world objects 25 as conveyed by world light 42. In the example of FIG. 5, real-world objects 25 include a roadway or pathway in front of the user for the sake of illustration. This is merely illustrative and, in general, real-world objects 25 may include any desired real-world objects.

Image light 22 may convey virtual objects within field of view 80 (e.g., virtual objects that are overlaid with real-world objects 25 by the optical combiner formed from waveguide 26 of FIG. 2). The virtual objects may include relatively small virtual objects confined to a peripheral region of field of view 80 such as peripheral region 82. Peripheral region 82 may extend along the top peripheral edge of field of view 80 (as shown in FIG. 5), may extend along the right peripheral edge of field of view 80, may extend along the left peripheral edge of field of view 80, and/or may extend along the bottom peripheral edge of field of view 80. Peripheral region 82 may occupy less than half of (e.g., less than 40% of, less than 30% of, less than 25% of, less than 20% of, less than 15% of, less than 10%, less than 5% of, etc.) the total area of field of view 80.

As shown in FIG. 5, the relatively small virtual objects in peripheral region 82 may include graphical elements such as graphical elements 84. As examples, graphical elements 84 may include visual icons, text-based messages or information, status indicators (e.g., a battery level indicator for system 10, a wireless signal strength indicator, a temperature indicator, a clock, an elapsed time indicator such as a visual timer, a geographic location indicator such as an indicator that identifies a geographic location of system 10, a speed indicator such as a speedometer, a step indicator, etc.), direction indicators (e.g., navigation direction indicators, compass information, orientation information, etc.), alerts (e.g., traffic alerts, hazard alerts that identify or highlight potentially hazardous real-world objects 25 in front of system 10, news alerts, etc.), notifications (e.g., text message notifications, email notifications, application notifications, etc.), photos, videos, health information (e.g., a pulse meter indicator, a blood oxygen indicator, etc.), website information, graphical elements associated with applications running on system 10, or any other graphic and/or text-based elements provided within peripheral region 82.

Because graphical elements 84 are relatively small compared to the total area of field of view 80, graphical elements 84 may only require some of the total brightness producible by display module 14A to be clearly visible at eye box 24. In order to minimize power consumption in system 10, when the image data to be conveyed by image light 22 includes only graphical elements 84, control circuitry 16 may control illumination optics 36 (FIGS. 3 and 4) to produce illumination light 38 using only the low power light sources 54L in light source sets 52A, 52B, and/or 52C. However, when larger virtual objects are included in the image data or when virtual objects are included in the image data for display outside of peripheral region 82 (see, e.g., virtual objects that are confined entirely within the region of field of view 80 that is outside of peripheral region 82, such as virtual object 90 and/or virtual objects that are included in the image data for display both within and outside of peripheral region 82, such as virtual object 88), control circuitry 16 may control illumination optics 36 (FIGS. 3 and 4) to produce illumination light 38 using both the low power light sources 54L and the high power light sources 54H in light source sets 52A, 52B, and/or 52C. This may ensure that the relatively large virtual objects and/or the virtual objects for display outside of peripheral region 82 are provided at eye box 24 with sufficient clarity.

The example of FIG. 5 is merely illustrative. Control circuitry 16 may produce illumination light 38 using only low power light sources 54L to display any desired image data within field of view 80 (e.g., when the virtual objects in the image data are smaller than a threshold size, when the virtual objects in the image data require less brightness than a threshold brightness to be clearly viewed at the eye box, when the ambient light level as sensed by an ambient light sensor in system 10 is less than a threshold level, when the virtual objects in the image data are confined to a particular region of field of view 80 such as within peripheral region 82 or within other regions of the field of view that are not peripheral regions, combinations of these, etc.). Similarly, control circuitry 16 may produce illumination light 38 using both low power light sources 54L and high power light sources 54H to display any desired image data within field of view 80 (e.g., when the virtual objects in the image data are larger than a threshold size, when the virtual objects in the image data require more brightness than a threshold brightness to be clearly viewed at the eye box, when the ambient light level as sensed by an ambient light sensor in system 10 is greater than a threshold level, when the virtual objects in the image data are not confined to a particular region of field of view 80, combinations of these, etc.). In this way, power may be conserved in display module 14A, thereby maximizing battery life, while also ensuring that virtual objects in image light 22 are clearly viewable at eye box 24 over time.

Figure 6:
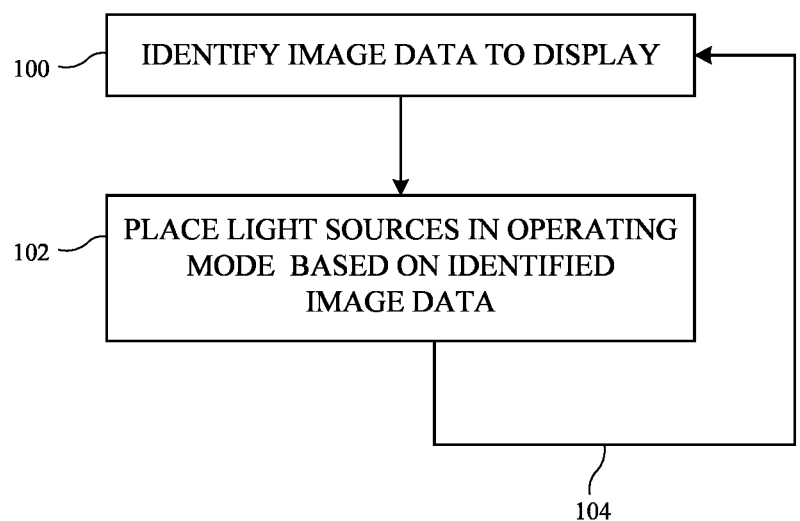
FIG. 6 is a flow chart of illustrative steps that may be performed by control circuitry in adjusting the operating mode of sets of light sources of the type shown in FIGS. 3 and 4 in accordance with some embodiments.

FIG. 6 is a flow chart of illustrative steps that may be performed by control circuitry 16 in controlling display module 14A to produce image light 22. At step 100, control circuitry 16 may identify image data to display. The image data may include a series of frames of image data (e.g., frames from a video stream, etc.). The image data may include one or more virtual objects to be displayed within field of view 80 at eye box 24 (e.g., graphical elements 84, virtual object 88, virtual object 90, and/or other virtual objects).

At step 102, control circuitry 16 may place the light source sets 52 in illumination optics 36 into a desired operating mode based on the identified image data (e.g., based on the virtual objects to be displayed by image light 22). Illumination optics 36 may produce illumination light 38 with a different respective amount of total brightness and may therefore consume a different amount of power in each of the operating modes. Processing may loop back to step 100, as shown by path 104, and control circuitry 16 may continue to update the operating mode of display module 14A as additional frames of image data are processed for display at eye box 24.

Figure 7:
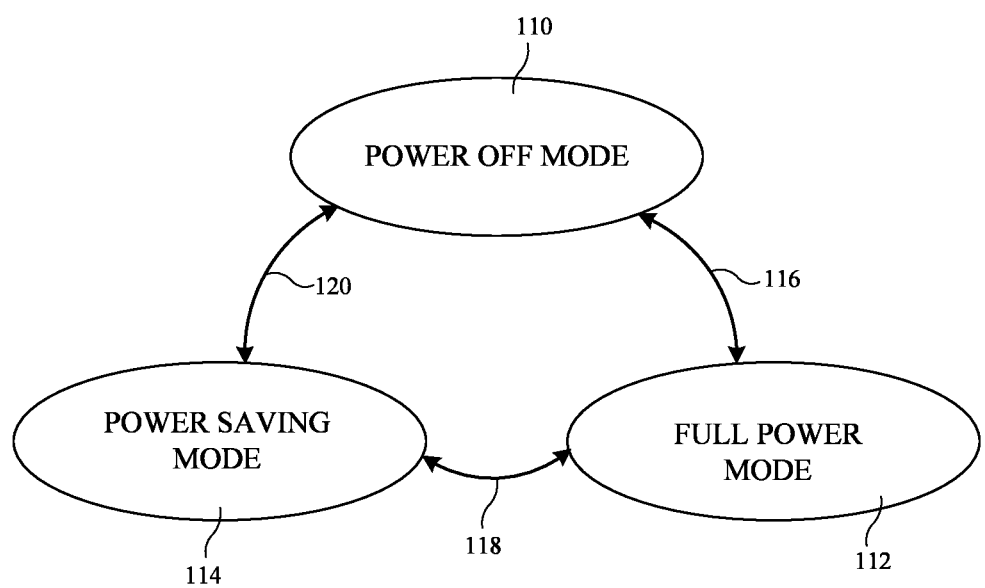
FIG. 7 is a state diagram showing illustrative operating modes for a display module of the type shown in FIGS. 2-4 in accordance with some embodiments.

FIG. 7 is a state diagram showing illustrative operating modes for illumination optics 36 and display module 14A. As shown in FIG. 7, display module 14A may have a first operating mode (state) such as power off mode (state) 110, a second operating mode (state) such as full power mode (state) 112, and a third operating mode (state) such as power saving mode (state) 114.

In power off mode 110, each of the high power light sources 54H and the low power light sources 54L in illumination optics 36 may be turned off (e.g., high power light sources 54H and low power light sources 54L may not produce any illumination light 38 in power off mode 110). Display module 14A will therefore not produce any image light 22 in power off mode 110. Display module 14A may be in power off mode 110 when no virtual objects are to be displayed at eye box 24, when the image data to be displayed at eye box 24 is entirely black, or when display module 14A is turned off, as examples.

When the image data includes virtual objects that are to be displayed using both low power light sources 54L and high power light sources 54H (e.g., as determined while processing step 100 of FIG. 6), control circuitry 16 may place display module 14A in full power mode 112, as shown by arrow 116 (e.g., while processing step 102 of FIG. 6). In full power mode 112, both the high power light sources 54H and the low power light sources 54L in illumination optics 36 may be concurrently active or enabled (turned on). The illumination light emitted by high power light sources 54H (e.g., as shown by arrows 58 of FIGS. 3 and 4) and the illumination light emitted by low power light sources 54L (e.g., as shown by arrows 60 of FIGS. 3 and 4) may combine to produce illumination light 38, which is reflected off of display panel 50 to produce image light 22. Image light 22 may convey relatively large virtual objects, relatively bright virtual objects, and/or virtual objects that lie outside of peripheral region 82 of field of view 80 (FIG. 5) in full power mode 112, as examples. Image light 22 may concurrently convey smaller virtual objects such as graphical elements 84 of FIG. 5 in full power mode 112 if desired. Control circuitry 16 may transition back to power off mode 110 (e.g., as shown by arrow 116 and while processing step 102 of FIG. 6) when there is no image data to be displayed or when the image data does not include any virtual objects to be displayed at eye box 24 (e.g., as determined while processing step 100 of FIG. 6).

When the image data includes virtual objects that are to be displayed using low power light sources 54L but not high power light sources 54H (e.g., as determined while processing step 100 of FIG. 6), control circuitry 16 may place display module 14A in power saving mode 114, as shown by arrow 118 (e.g., while processing step 102 of FIG. 6). In power saving mode 114, the high power light sources 54H may be inactive or disabled (turned off) while the low power light sources 54L are active or enabled (turned on). The illumination light emitted by low power light sources 54L (e.g., as shown by arrows 60 of FIGS. 3 and 4) may combine to produce illumination light 38, which is reflected off of display panel 50 to produce image light 22. Image light 22 may convey relatively small virtual objects, relatively dim virtual objects, and/or virtual objects that lie within peripheral region 82 of field of view 80 (see, e.g., graphical elements 84 of FIG. 5) in power saving mode 114, for example. Display module 14A may consume significantly less power in power saving mode 114 than in full power mode 112.

Control circuitry 16 may transition back to power off mode 110 (e.g., as shown by arrow 116 and while processing step 102 of FIG. 6) when there is no image data to be displayed or when the image data does not include any virtual objects to be displayed at eye box 24 (e.g., as determined while processing step 100 of FIG. 6). Control circuitry 16 may transition back to full power mode 112 (e.g., as shown by arrow 118 and while processing step 102 of FIG. 6) when the image data includes virtual objects that are to be displayed using both low power light sources 54L and high power light sources 54H (e.g., as determined while processing step 100 of FIG. 6). The example of FIG. 7 is merely illustrative. Display module 14A may have more than three operating modes if desired.

In accordance with an embodiment, a display system is provided that includes illumination optics configured to produce illumination light, the illumination optics include a first light source configured to emit a first portion of the illumination light within a color band, and a second light source configured to emit a second portion of the illumination light within the color band, a spatial light modulator configured to produce image light by modulating the illumination light using image data, a waveguide configured to direct the image light towards an eye box, and control circuitry configured to selectively disable the second light source based on the image data.

In accordance with another embodiment, the first portion of the illumination light has a first intensity and the second portion of the illumination light has a second intensity that is greater than the first intensity.

In accordance with another embodiment, the illumination optics include a light-emitting diode (LED) package, the first light source includes a first emissive surface of the LED package, the second light source includes a second emissive surface of the LED package, and the second emissive surface is larger than the first emissive surface.

In accordance with another embodiment, the illumination optics include a third light source configured to emit a third portion of the illumination light within a first additional color band that is different from the color band, and a fourth light source configured to emit a fourth portion of the illumination light within the first additional color band, the control circuitry is configured to selectively disable the fourth light source based on the image data.

In accordance with another embodiment, the illumination optics include a fifth light source configured to emit a fifth portion of the illumination light within a second additional color band that is different from the color band and the first additional color band, and a sixth light source configured to emit a sixth portion of the illumination light within the second additional color band, the control circuitry is configured to selectively disable the sixth light source based on the image data.

In accordance with another embodiment, the control circuitry is configured to adjust the illumination optics between a first operating state in which the first, second, third, fourth, fifth, and sixth light sources are active and a second operating state in which the first, third, and fifth light sources are active while the second, fourth, and sixth light sources are inactive.

In accordance with another embodiment, the second light source emits more power than the first light source, the fourth light source emits more power than the third light source, and the sixth light source emits more power than the fifth light source.

In accordance with another embodiment, the control circuitry is configured to place the illumination optics in the second operating state when virtual objects in the image data are confined to a peripheral region of a field of view of the eye box.

In accordance with another embodiment, the waveguide is configured to transmit world light to the eye box while overlaying the virtual objects with the world light.

In accordance with another embodiment, the peripheral region includes a top edge of the field of view and the virtual objects include graphical elements that run along the top edge.

In accordance with another embodiment, the control circuitry is configured to place the illumination optics in the first operating state when the image data includes a virtual object that lies outside of the peripheral region of the field of view.

In accordance with another embodiment, the control circuitry is configured to place the illumination optics in the first operating state when the image data includes a virtual object that is larger than a threshold size.

In accordance with another embodiment, the illumination optics include a first light-emitting diode (LED) package that includes the first and second light sources, and a second LED package that includes the third, fourth, fifth, and sixth light sources.

In accordance with another embodiment, the display element includes a dichroic element configured to produce the illumination light by combining the first, second, third, fourth, fifth, and sixth portions of the illumination light.

In accordance with another embodiment, the illumination optics include a first light-emitting diode (LED) package that includes the first and second light sources, a second LED package that includes the third and fourth light sources, a third LED package that includes the fifth and sixth light sources, and an X-plate configured to produce the illumination light by combining the first, second, third, fourth, fifth, and sixth portions of the illumination light.

In accordance with another embodiment, the spatial light modulator includes a reflective display panel selected from the group consisting of a liquid crystal on silicon (LCOS) display panel and a digital-micromirror device (DMD) display panel.

In accordance with an embodiment, a display system is provided that includes a first light-emitting diode (LED) package that includes a first light source configured to emit first light of a first color and a second light source configured to emit second light of the first color and with less intensity than the first light, a second LED package that includes a third light source configured to emit third light of a second color that is different from the first color and a fourth light source configured to emit fourth light of the second color and with less intensity than the third light, control circuitry configured to adjust the display system between a first operating mode in which the first, second, third, and fourth light sources are active and a second operating mode in which the second and fourth light sources are active while the first and third light sources are inactive, a spatial light modulator configured to produce image light by modulating illumination light using image data, the illumination light includes the first, second, third, and fourth light when the display system is in the first operating mode and the illumination light includes the second and fourth light when the display system is in the second operating mode, and a waveguide configured to direct the image light towards an eye box.

In accordance with another embodiment, the spatial light modulator includes a reflective display panel and the control circuitry is configured to adjust the display between the first and second operating modes based on the image data.

In accordance with an embodiment, an electronic device for providing image light at an eye box, the electronic device is provided that includes a first light-emitting diode (LED) package that includes a first light-emitting surface configured to emit first light of a first color and a second light-emitting surface configured to emit second light of the first color and with less intensity than the first light, a second LED package that includes a third light-emitting surface configured to emit third light of a second color that is different from the first color, a fourth light-emitting surface configured to emit fourth light of the second color and with less intensity than the third light, a fifth light-emitting surface configured to emit fifth light of a third color that is different from the first and second colors, and a sixth light-emitting surface configured to emit sixth light of the third color and with less intensity than the fifth light, control circuitry configured to adjust the electronic device between a first operating state in which the first, second, third, fourth, fifth, and sixth light-emitting surfaces are active and a second operating state in which the second, fourth, and sixth light-emitting surfaces are active while the first, third, and fifth light-emitting surfaces are inactive, a reflective display panel configured to produce image light by modulating illumination light using image data, the illumination light includes the first, second, third, fourth, fifth, and sixth light when the electronic device is in the first operating state and the illumination light includes the second, fourth, and sixth light when the electronic device is in the second operating state, and a waveguide configured to direct the image light towards the eye box.

In accordance with another embodiment, the control circuitry is configured to adjust the electronic device between the first and second operating states based on the image data and the image data includes graphical elements that are confined to a peripheral region of a field of view of the eye box when the electronic device is in the second operating mode.

The foregoing is merely illustrative and various modifications can be made to the described embodiments. The foregoing embodiments may be implemented individually or in any combination.

What is claimed is:

1. A display system comprising:
    illumination optics configured to produce illumination light, wherein the illumination optics comprise:
        a first light source configured to emit a first portion of the illumination light within a first color band,
        a second light source configured to emit a second portion of the illumination light within the first color band,
        a third light source configured to emit a third portion of the illumination light within a second color band that is different from the first color band,
        a fourth light source configured to emit a fourth portion of the illumination light within the second color band,
        a fifth light source configured to emit a fifth portion of the illumination light within a third color band that is different from the first and second color bands, and
        a sixth light source configured to emit a sixth portion of the illumination light within the third color band;
    a spatial light modulator configured to produce image light by modulating the illumination light using image data;
    a waveguide configured to direct the image light towards an eye box; and
    control circuitry configured to selectively disable the second, fourth, and sixth light sources based on the image data, wherein the control circuitry is configured to adjust the illumination optics between a first operating state in which the first, second, third, fourth, fifth, and sixth light sources are active and a second operating state in which the first, third, and fifth light sources are active while the second, fourth, and sixth light sources are inactive.

2. The display system of claim 1, wherein the first portion of the illumination light has a first intensity and the second portion of the illumination light has a second intensity that is greater than the first intensity.

3. The display system of claim 2, wherein the illumination optics comprise a light-emitting diode (LED) package, the first light source comprises a first emissive surface of the LED package, the second light source comprises a second emissive surface of the LED package, and the second emissive surface is larger than the first emissive surface.

4. The display system of claim 1, wherein the second light source emits more power than the first light source, the fourth light source emits more power than the third light source, and the sixth light source emits more power than the fifth light source.

5. The display system of claim 4, wherein the control circuitry is configured to place the illumination optics in the second operating state when virtual objects in the image data are confined to a peripheral region of a field of view of the eye box.

6. The display system of claim 5, wherein the waveguide is configured to transmit world light to the eye box while overlaying the virtual objects with the world light.

7. The display system of claim 6, wherein the peripheral region comprises a top edge of the field of view and wherein the virtual objects comprise graphical elements that run along the top edge.

8. The display system of claim 6, wherein the control circuitry is configured to place the illumination optics in the first operating state when the image data includes a virtual object that lies at least partially outside of the peripheral region of the field of view.

9. The display system of claim 6, wherein the control circuitry is configured to place the illumination optics in the first operating state when the image data includes a virtual object that is larger than a threshold size.

10. The display system of claim 1, wherein the illumination optics comprise:
    a first light-emitting diode (LED) package that includes the first and second light sources; and
    a second LED package that includes the third, fourth, fifth, and sixth light sources.

11. The display element of claim 10, further comprising a dichroic element configured to produce the illumination light by combining the first, second, third, fourth, fifth, and sixth portions of the illumination light.

12. The display system of claim 1, wherein the illumination optics comprise:
    a first light-emitting diode (LED) package that includes the first and second light sources;
    a second LED package that includes the third and fourth light sources;
    a third LED package that includes the fifth and sixth light sources; and
    an X-plate configured to produce the illumination light by combining the first, second, third, fourth, fifth, and sixth portions of the illumination light.

13. The display system of claim 1, wherein the spatial light modulator comprises a reflective display panel selected from the group consisting of: a liquid crystal on silicon (LCOS) display panel and a digital-micromirror device (DMD) display panel.

14. A display system comprising:
- a first light-emitting diode (LED) package that comprises a first light source configured to emit first light of a first color and a second light source configured to emit second light of the first color and with less intensity than the first light;
- a second LED package that comprises a third light source configured to emit third light of a second color that is different from the first color and a fourth light source configured to emit fourth light of the second color and with less intensity than the third light;
- control circuitry configured to adjust the display system between a first operating mode in which the first, second, third, and fourth light sources are active and a second operating mode in which the second and fourth light sources are active while the first and third light sources are inactive;
- a spatial light modulator configured to produce image light by modulating illumination light using image data, wherein the illumination light includes the first, second, third, and fourth light when the display system is in the first operating mode and the illumination light includes the second and fourth light when the display system is in the second operating mode; and
- a waveguide configured to direct the image light towards an eye box.

15. The display system of claim 14, wherein the spatial light modulator comprises a reflective display panel and wherein the control circuitry is configured to adjust the display between the first and second operating modes based on the image data.

16. An electronic device for providing image light at an eye box, the electronic device comprising:
- a first light-emitting diode (LED) package that comprises a first light-emitting surface configured to emit first light of a first color and a second light-emitting surface configured to emit second light of the first color and with less intensity than the first light;
- a second LED package that comprises a third light-emitting surface configured to emit third light of a second color that is different from the first color, a fourth light-emitting surface configured to emit fourth light of the second color and with less intensity than the third light, a fifth light-emitting surface configured to emit fifth light of a third color that is different from the first and second colors, and a sixth light-emitting surface configured to emit sixth light of the third color and with less intensity than the fifth light;
- control circuitry configured to adjust the electronic device between a first operating state in which the first, second, third, fourth, fifth, and sixth light-emitting surfaces are active and a second operating state in which the second, fourth, and sixth light-emitting surfaces are active while the first, third, and fifth light-emitting surfaces are inactive;
- a reflective display panel configured to produce image light by modulating illumination light using image data, wherein the illumination light includes the first, second, third, fourth, fifth, and sixth light when the electronic device is in the first operating state and the illumination light includes the second, fourth, and sixth light when the electronic device is in the second operating state; and
- a waveguide configured to direct the image light towards the eye box.

17. The electronic device of claim 16, wherein the control circuitry is configured to adjust the electronic device between the first and second operating states based on the image data and wherein the image data comprises graphical elements that are confined to a peripheral region of a field of view of the eye box when the electronic device is in the second operating mode.

* * * * *